(12) United States Patent
McGee et al.

(10) Patent No.: US 10,970,213 B2
(45) Date of Patent: Apr. 6, 2021

(54) SELECTIVE DISABLING OF HARDWARE-BASED CACHE COHERENCY AND ENFORCEMENT OF SOFTWARE-BASED CACHE COHERENCY

(71) Applicant: HEWLETT PACKARD ENTERPRISE DEVELOPMENT LP, Houston, TX (US)

(72) Inventors: Thomas McGee, Chippewa Falls, WI (US); Michael S. Woodacre, Winchester (GB); Michael Malewicki, Chippewa Falls, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/399,455

(22) Filed: Apr. 30, 2019

(65) Prior Publication Data
US 2020/0349075 A1 Nov. 5, 2020

(51) Int. Cl.
*G06F 12/0815* (2016.01)
(52) U.S. Cl.
CPC .. *G06F 12/0815* (2013.01); *G06F 2212/1032* (2013.01)
(58) Field of Classification Search
CPC .............. G06F 12/0815; G06F 2212/1032
See application file for complete search history.

(56) References Cited

U.S. PATENT DOCUMENTS 6,760,809 B2 7/2004 Arimilli et al.
7,373,461 B2 5/2008 Zeffer et al.
(Continued)

OTHER PUBLICATIONS

Kontothanassis, L. et al, "Software Cache Coherence for Large Scale Multiprocessors," Proceedings of 1995 1st IEEE Symposium on High Performance Computer Architecture (HPCA '95), Raleigh, NC, USA, Jan. 22-25, 1995, 10 pages.*
(Continued)

*Primary Examiner* — Tuan V Thai
(74) *Attorney, Agent, or Firm* — Sheppard Mullin Richter & Hampton LLP

(57) ABSTRACT

An apparatus, system, and method of enforcing cache coherency in a multiprocessor shared memory system are disclosed. A request is received from a node controller, to process a cache coherent operation on a memory block in a shared memory. Based on the information included in the request, a determination is made as to whether the request was transmitted from a processor that is remote relative to the memory that includes the memory block referenced in the request. If the request is from a remote processor, a hardware-based cache coherency of the system is disabled, and request is processed according to software-based cache coherency protocols and mechanisms. A coherent read request may be translated to a non-coherent request, such as an immediate read request, which does not trigger tracking or storing state and ownership information of the requested memory block, or trigger communications with processors other than those involved with request. Processing a coherent write request may include transmitting an exclusive read request, which is a request for ownership of the memory block identified in the coherent write request, and transmitting a write acknowledgment to the node controller.

18 Claims, 5 Drawing Sheets

(56) References Cited

U.S. PATENT DOCUMENTS

| | | | |
|---|---|---|---|
| 8,904,154 | B2 | 12/2014 | Devadas et al. |
| 2007/0180197 | A1 | 8/2007 | Wright et al. |
| 2008/0147988 | A1* | 6/2008 | Heller .................. G06F 12/0831 |
| | | | 711/141 |
| 2015/0095008 | A1* | 4/2015 | Wang .................. G06F 12/0837 |
| | | | 703/20 |
| 2016/0274941 | A1* | 9/2016 | Krithivas .............. G06F 13/126 |
| 2016/0328326 | A1* | 11/2016 | Di Blas ............... G06F 12/0837 |
| 2017/0052860 | A1* | 2/2017 | Das Sharma ....... G06F 11/2092 |
| 2019/0057032 | A1* | 2/2019 | Li ....................... G06F 12/0828 |
| 2019/0121762 | A1* | 4/2019 | McGee ............... G06F 12/0815 |

OTHER PUBLICATIONS

Christgau, S. et al, "Software-managed Cache Coherence for Fast One-sided Communication," presentation slides, Mar. 12, 2016, pp. 1-33, University of Potsdam, Germany, https://www.cs.uni-potsdam.de/bs/research/docs/slides/2016/cs16a.pdf.*

Christgau, S. et al, "Software-Managed Cache Coherence for fast One-Sided Communication," Proceedings of the 7th International Workshop on Programming Models and Applications for Multicores and Manycores, PMAM '16, Mar. 2016, 9 pages.*

Zhou, Xiaocheng et al, "A Case for Software Managed Coherence in Many-core Processors," Proceedings of the 2nd USENIX Conference on Hot Topics in Parallelism (HOTPAR '10), Jun. 14-15, 2010, 6 pages.*

\* cited by examiner

SELECTIVE DISABLING OF HARDWARE-BASED CACHE COHERENCY AND ENFORCEMENT OF SOFTWARE-BASED CACHE COHERENCY

BACKGROUND

In a multiprocessor shared memory system, data can be shared among and accessed by multiple processors. Cache coherency is employed to ensure that changes to shared data or to copies of shared data are propagated throughout the system, such that all processors have access to uniform or coherent data. To this end, multiprocessor shared memory systems enforce cache coherency using hardware- or software-based protocols and mechanisms to arbitrate access to the shared memory and enable the processors to see the same data.

BRIEF DESCRIPTION OF THE DRAWINGS

Certain examples are described in the following detailed description and in reference to the drawings, in which.

DETAILED DESCRIPTION

Figure 1:
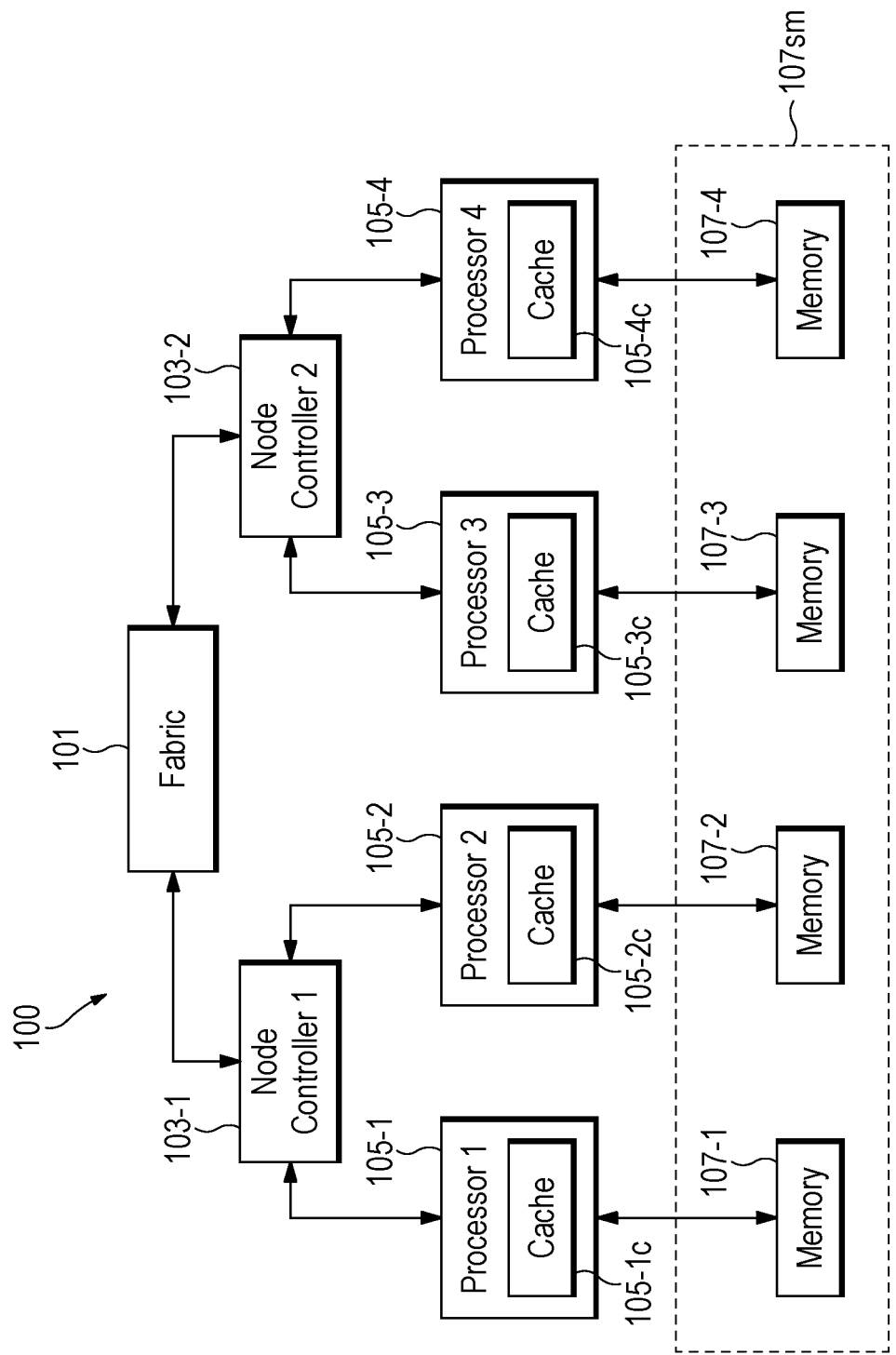
FIG. 1 is a diagram illustrating an exemplary embodiment of a cache coherent computing system.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

The present disclosure provides for the management and enforcement of cache coherency in multiprocessor shared memory systems, to ensure that processors sharing the memory can have access to uniform or coherent data. Cache coherency can be enforced using hardware- or software-based mechanism and protocols. For example, hardware-based approaches employ hardware components to enforce cache coherency in multiprocessor shared memory systems. As known to those of ordinary skill in the art, these approaches can include directory- or snoop-based protocols.

Directory-based protocols employ, among other things, coherency directories to track state and ownership information (e.g., whether a shared memory block is being shared with processors and, if so, with which processors) of memory blocks in the shared memory. When requests are made to process coherent operations such as reads or writes on memory blocks of the shared memory, the state and ownership information of the directories is used to coherently process the request. This can include managing various communications among processors and other computing components, for example, to share state and ownership information and effectuate the operation. Snoop-based protocols enforce cache coherency by broadcasting messages to processors sharing the memory, indicating when coherent operations on the shared memory are requested or processed. These messages can cause the processors, for example, to update or invalidate their copies of shared data from the shared memory. In this way, the processors can avoid working on copies of data that are not coherent.

Hardware-based coherency requires hardware resources to be consumed on various devices or components throughout the system, for example, to manage and transmit messages among the processors and/or to store data (e.g., state, ownership) needed to ensure coherency. This overhead can include bandwidth consumed on the interconnect between processors as coherency messages are passed back and forth, latency as conflicts between processors are resolved, and possibly physical storage for directories. Notably, this resource overhead can continue to grow as the system scales.

The present disclosure enables the disabling of hardware-based cache coherency mechanisms and protocols. The disabling can be for certain types of coherent requests, such as requests to process coherent operations on a memory that are received from processors that are remote to that memory. Software-based cache coherency can instead be employed for such coherent request from remote processors, which can reduce bandwidth and latency overheads.

FIG. 1 illustrates an exemplary embodiment of a cache coherent computing system 100 (or "system") formed of various interconnected computing components. In some embodiments, the system 100 is a multiprocessor system that includes a shared memory accessible by some or all of the processors. More specifically, as shown in FIG. 1, the system 100 includes processors 105-1 (processor 1), 105-2 (processor 2), 105-3 (processor 3) and 105-4 (processor 5) (collectively referred to herein as "105" or "processors 105"). As described in further detail below, the processors 105 are communicatively coupled to respective node controllers 103-1 (node controller 1) and 103-2 (node controller 2) (collectively referred to herein as "103" or "node controllers 103"), through which they can communicate with one another.

Each of the processors 105 can be or refer to one or more processing resources, nodes or units configured to execute instructions. For example, each of the processors 105 can be or refer to one or more central processing units (CPUs), a dual-core or a multi-core processor or processor socket that includes two or more CPUs, a single core of a processor, a computing cluster, a cloud server, or the like. In some embodiments, two or more of the processors 105 (e.g., processor 105-1 and processor 105-3) can be communicatively coupled using point-to-point interconnects or busses. For example, two or more of the processors 105 can be connected using an Ultra Path Interconnect (UPI) or a QuickPath Interconnect (QPI), both of Intel® Corporation.

Moreover, each of the processors 105 can include or be associated with one or more processor caches for storing copies of data stored in a shared system memory (described in further detail below), and thereby making that data more quickly accessible by the processors. Specifically, caches 105-1c, 105-2c, 105-3c, and 105-4c (collectively referred to herein as "105c" or "caches 105c") are included and/or associated with the processors 105-1, 105-2, 105-3 and 105-4, respectively. It should be understood that, in some embodiments, multiple processors or cores can share a single cache. It should also be understood that each cache can be physically disposed on the same or a separate chip or component as its corresponding processor. Because data can be accessed more quickly by a processor from its cache than from system memory, the caches 105c can be used to store copies of data stored in system memory that, for example, are accessed or are more likely to be accessed frequently or imminently, and/or may otherwise need to be accessed with more efficiency by a processor.

As shown in FIG. 1, the processors 105-1, 105-2, 105-3 and 105-4 are communicatively coupled to memories 107-1, 107-2, 107-3 and 107-4 (collectively referred to herein as "107" or "memories 107"), respectively. In some embodiments, the memories 107 form a shared system memory that can be accessed by all or some of the processors 105, as described in further detail below. It should be understood that, while each of the processors 105 can, in some embodiments, be communicatively coupled to and/or access data in one or more of the memories 107, each of the processors 105 can be directly associated with a respective one of the memories 107. Such correspondence or association between each of the processors 105 and a respective one of the memories 107 can be caused by or result from a direct attachment or connection therebetween. For example, the processor 105-1 can be directly attached to the memory 107-1, as illustrated in FIG. 1. In some embodiments, a memory (e.g., memory 107-1) can be deemed to be "local" to its corresponding (e.g., directly connected) processor (e.g., processor 105-1), and can be referred to as "local memory" relative to its corresponding processor. On the other hand, a memory (e.g., memory 107-1) can be deemed to be "remote" and can be referred to as "remote memory" relative to other processors (e.g., processor 105-3) beyond its local processor.

The processors 105 (and/or memory controllers of the processors 105) can be communicatively coupled (e.g., directly connected) to their respective memories 107 via one or more memory channels and/or buses such as a Peripheral Component Interconnect (PCI) bus, an Industry Standard Architecture (ISA) bus, a PCI Express (PCIe) bus, and high performance links, such as the Intel® direct media interface (DMI) system, QuickPath Interconnects, Hyper-Transport, Double Data Rate (DDR), Serial AT Attachment (SATA), Small Computer System Interface (SCSI), or Fibre Channel (FC) Bus, and the like.

Each of the memories 107 can include or be made up of any number of memory devices, which can be or include volatile (e.g., Random Access Memory (RAM), Static RAM (RAM) (SRAM), Dynamic RAM (DRAM)) and/or non-volatile (e.g., Non-Volatile RAM (NVRAM), Double Data Rate 4 Synchronous Dynamic (RAM) DDR4 SDRAM) memory devices. Other types of memory devices that may be used include read-only memory (ROM) (e.g., mask ROM, programmable ROM (PROM), erasable programmable ROM (EPROM), and electrically erasable programmable ROM (EEPROM)), flash memory, memristor devices, and the like.

Moreover, each of the memories 107 can be used to store software such as operating systems (OSs), hypervisors and other applications. The software stored on the memories 107 is made up of processes and/or threads that can be executed concurrently and share resources such as memory (e.g., memories 107) and processors (e.g., processors 105). The processes and/or thread, when executed, can cause requests and responses to be transmitted among the processors 105 (and/or the node controllers 103-1 and 103-2). As described in further detail below, in some embodiments, the software stored in the memories 107 can be used to provide cache coherency (e.g., in software-managed cache coherency implementations).

As mentioned above, the memories 107 (or blocks or regions thereof) can form a shared system memory 107sm. Some or all of the processors 105 can access data stored in the system memory 107sm. For example, data stored in a portion of the memory 107-1 that is shared and thus a part of the system memory 107sm can be accessed by processors other than the local processor 105-1. It should be understood that permissions can be used to control access to all or portions of the system memory 107sm and/or by all or some of the processors 105. It should be understood that, for purposes of simplicity, unless indicated otherwise, reference herein to any or all of the memories 107 shall refer to the portions that are shared and that make up the system memory 107sm, although the memories 107 can, in some embodiments, include non-shared regions that are only accessible by their respective local processors.

In some embodiments, accesses to and/or management of (e.g., cache coherency) the memories 107 can be provided or handled by the corresponding node controllers 103. In this regard, it should be understood that the processors (e.g., processor 105-1 and 105-2) and their corresponding memories (e.g., memories 107-1 and 107-2) are deemed to be local to the node controller (e.g., node controller 103-1) with which they are associated (e.g., directly connected to, or most closely connected to). The node controllers 103 are therefore configured to provide and/or execute various functions on behalf of, for, or associated with their local or respective computing resources (e.g., memories, processors). Such functions can include or relate to cache coherency, routing, load balancing, fault resilience and the like. In some embodiments, some or all of the functionality of each of the node controllers 103 described herein can be implemented in a processor (e.g., one of the processors 105).

The node controllers 103 (also referred to as "hubs" or "interconnect agents") are computing devices or components, which can be or include a general purpose processor (e.g., microprocessor, conventional processor, controller, microcontroller, state machine, sequencer), a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein, among others. It should be understood that the computing system 100 can include any number of node controllers. As described in further detail below, the node controllers 103 can provide, participate in or otherwise facilitate cache coherency (e.g., enforce cache coherency protocols) using hardware- and software-based approaches.

Although not illustrated in FIG. 1, each of the node controllers 103 can include one or more memories or memory devices, such as ROM, RAM, EEPROM, flash memory, registers or any other form of storage medium or element known to those of ordinary skill in the art. In some embodiments, cache coherency can be directory-based, such that the memory or storage of the node controllers 103 can be used to store information such as state and ownership relating to memory blocks in their local memories. It should be understood, however, that as described herein, state and ownership information can additionally or alternatively be stored in the memories 107.

As illustrated in exemplary FIG. 1, the node controller 103-1 is communicatively coupled to and/or associated with the processors 105-1 and 105-2, and the memories 107-1 and 107-2; and the node controller 103-2 is communicatively coupled to and/or associated with the processors 105-3 and 105-4, and the memories 107-3 and 107-4. It should be understood that each of the node controllers 103 can be communicatively coupled to and/or associated with any number of local processors and/or memories. In some embodiments, the node controllers 103 are communicatively coupled and/or connected to their respective, local processors via interconnects such as UPI links.

Each of the node controllers 103 can be configured to provide cache coherency, such that changes to data stored in shared memory can be propagated throughout the system 100, to ensure that all processors have access to uniform versions of that shared data. The node controllers 103 can provide cache coherency by implementing directory- or snoop-based cache coherency schemes or protocols. In this regard, in some embodiments, each of the node controllers 103 can include a snoop or request accelerator and/or a coherency controller, which are configured to store information for and perform cache coherency functions. The node controllers (and/or their request accelerators and coherency controllers) can be or include computer hardware (e.g., sequencer, state machine) such as a circuit that includes logic and memory devices or storage elements. The logic is configured to execute or perform one or more of the functions, processes and/or methods described herein, including those for providing or managing cache coherency. The memory devices or storage elements can include caches and be used to store directories, as described in further detail below.

To provide directory-based cache coherency, the node controllers 103 employ coherency directories to track and/or store the state and ownership of all or subsets of memory blocks in their local memories. Coherency directories can be stored in the memories 107 and/or in the node controllers 103. By storing directories in the node controllers 103, the node controllers can efficiently access state and ownership information without needing to retrieve that information from directories in the memories 107. In some embodiments, the node controllers 103 can include coherency directory caches, which can be used to store copies of coherency directory entries from the directories in the memories 107. As with storing coherency directories in the node controllers 103, the use of coherency directory caches allows the node controllers 103 to more efficiently access state and ownership information.

To provide snoop-based cache coherency, the node controllers 103 can process snoop messages. As known to those of ordinary skill in the art, snoop messages can be broadcast to node controllers having copies of a memory block for which a request to read or write thereto has been made. In some embodiments, the node controllers 103 can store information or counters of the number of memory blocks within a memory region that are shared (e.g., active) or not shared (e.g., invalid) with processors or processor caches. Such information can be used to determine whether snoop requests need to be broadcast to other node controllers or processors, in cases in which a memory block to be accessed is shared.

The node controllers 103 can be communicatively coupled to and/or interconnected with one another via the fabric 101 (or "fabric interconnect") and, the processors 105 can communicate with one another therethrough. The fabric 101 can include one or more direct and/or switched interconnects. For example, in some embodiments, the fabric 101 can include direct interconnections between the node controllers 103-1 and 103-2 (e.g., to minimize latency). Accordingly, the fabric 101 can be used to transmit data and/or messages between or among one or more of the node controllers 103 and/or processors 105. Such communications can include, for example, memory access requests (e.g., to read or write from or to memory or cache blocks), state change requests (e.g., invalidate), acknowledgments, and other messages known to those of ordinary skill in the art and as needed for the applicable cache coherency protocols.

It should be understood that the components (e.g., node controllers 103, processors 105, memories 107) of the system 100 can be physically housed together or separately. For instance, the exemplary components of the system 100 illustrated in FIG. 1 can be provided in a single chassis or in multiple chasses. As described above, the system 100 can include any number of node controllers, processors, and/or memories beyond those illustrated in FIG. 1, which can be housed together or separately. Moreover, in some embodiments, the system 100 can include additional systems or sub-systems that are formed of node controllers, processors and/or memories, and are communicatively coupled to the fabric 101, through which communications with the node controllers 103 and processors 105 can be achieved.

Figure 2:
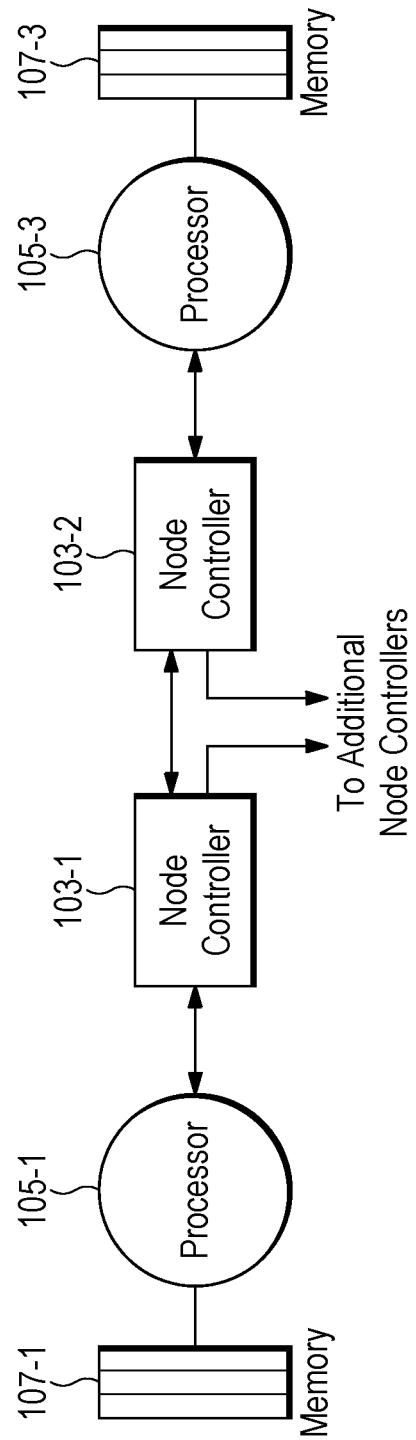
FIG. 2 is a diagram illustrating an exemplary embodiment of the cache coherent computing system of FIG. 1, for providing hardware-based cache coherency.

FIG. 2 illustrates an exemplary embodiment of the cache coherent computing system 100. As shown, the node controller 103-1 is associated with the processor 105-1 and its local memory 107-1, which may be just one of a number of processors and memories that are local to the node controller 103-1. The node controller 103-2 is associated with the processor 105-3 and its local memory 107-3, which may be just one of a number of processors and memories that are local to the node controller 103-2. Although not illustrated in FIG. 2, the processors 105-1 and 105-3 can include respective processor caches 105-1c and 105-3c, respectively. As described above, the node controllers 103-1 and 103-2 can be communicatively coupled to one another via a fabric 101, which can include or be made up of direct and/or switched interconnects, and the like.

In some embodiments, the node controllers 103-1 and 103-2 are configured to provide hardware-based cache coherency as follows. For purposes of illustration, one example implementation of a directory based cache coherency protocol will now be described with reference to a coherent read request. It should be understood, however, that directory-based cache coherency protocols are configured to also provide cache coherency when processing any type of request (e.g., read, write) beyond a coherent read type request. The processor 105-1 transmits a coherent read request to its home node controller 103-1. Because the request is to read data from a shared memory accessible by multiple processors, the request is a coherent read request such that the data to be read is coherent or uniform throughout the system, as opposed to a non-coherent version of the data. The read request can include, among other things, a memory address or other identifier of the memory block from where data is to be read. For example, the read request sent by the processor 105-1 can include a memory address m3x0003 or other identifier of a memory block mb03 (not shown) located in the memory 107-3.

In some embodiments, if a copy of the data is identified as being stored in the cache 105-1c of FIG. 1, the request causes a cache hit in the cache 105-1c. As such, a copy of the data from the memory address m3x0003 of the memory 107-3, cached in the cache 105-1c, can be transmitted from the cache 105-1c to the processor 105-1 for processing. On the other hand, if a copy of the data is not stored in the cache 105-1c, the request causes a cache miss in the cache 105-1c.

Accordingly, the node controller 103-1 can in turn transmit the coherent read request to the node controller 103-3, which is the home node controller associated with the memory 107-3, in which the memory block mb03 located at memory address m3x0003 is located. The node controller 103-1 can determine the home node controller of the relevant memory block based on the memory address included in the request, and thereby direct the request to the proper node controller. The request can include, among other things, a message type (e.g., coherent read, coherent write) indicating the processing (e.g., instructions) to be performed and the memory address (or other identifier) of the memory block in which the requested data is stored. In some embodiments an identifier of the requestor or source of the request (e.g., ID of the requestor processor) can be included in the request.

In turn, the node controller 103-3 receives the coherent read request and determines or checks the state of the relevant memory block mb03—e.g., whether the memory block mb03 is dirty or not dirty. As known to those of ordinary skill in the art, by virtue of checking the state of the memory block before transmitting the requested data, cache coherency can be maintained. In some directory-based cache coherency protocols, determining whether the memory block is dirty or not dirty can be based on the stored state and ownership information of the memory block. The state and ownership information of a memory block can be obtained from a coherency directory, which can be stored in the corresponding node controller or memory. For instance, the memory 107-3 can include a coherency directory in which the state and ownership information of the memory block mb03 is stored. In some embodiments, the coherency directory can additionally or alternatively be stored in the node controller 103-3, to provide faster access by the node controller 103-3 to the state and ownership information of the memory block mb03. In some embodiments, the node controller 103-3 can include a coherency directory cache that stores copies of a subset of the entries from the coherency directory stored in the memory 107-3. The coherency directory cache can likewise provide faster access by the node controller 103-3 to certain state and ownership information.

For purposes of illustration with respect to FIG. 2, as known to those of ordinary skill in the art, if the memory block mb03 is dirty, it means that another processor (e.g., other than the local processor 105-3) has a cached copy of the data of the memory block mb03, and has modified that data. In other words, a dirty memory block determination indicates that the data in the memory block mb03 as stored in the memory 107-3 is or may be stale. On the other hand, if the memory block mb03 is not dirty, it means that the data in the memory block mb03 as stored in the memory 107-3 is valid and up-to-date.

Accordingly, if the node controller 103-3 determines that the memory block mb03 is not dirty, the node controller 103-3 can transmit a request to the processor 105-3 to obtain the data from the memory block mb03 in the memory 107-3. It should be understood that, according to some cache coherency protocols, the request transmitted to the processor 105-3 can be based on the request sent by the node controller 103-1 to the node controller 103-2, but need not be the same. That is, for example, the node controller 103-2 can change the type of request as it deems appropriate. For instance, a request that originated as a coherent read request can become a read non-exclusive request (or other) when sent from the node controller 103-2 to the processor 105-3. Moreover, data from the original request can be modified, added to or removed when transmitting the request from the node controller 103-2 to the processor 105-3.

The processor 105-3 receives the request from the node controller 103-2 and transmits a response to the node controller 103-2, which can be, for example, a coherent response. The node controller 103-2 in turn transmits a coherent response to the node controller 103-1, which in turn transmits a coherent response to the requestor processor 105-1. It should be understood that each response can be different. In some embodiments, the coherent responses can include a coherent copy of the data obtained from the memory block mb03, as requested by the processor 105-1. The response and that data therein can be said to be coherent because of the determination that the memory block mb03 was not in a dirty state—and thus, no other processors had modified that data. Moreover, when transmitting the coherent response, the node controller 103-2 further maintains coherency by updating the state of the memory block mb03 in the coherency directory in accordance with the cache coherency protocol being implemented. For example, when responding to a coherent read request (as opposed to, for instance, an exclusive write request), the node controller 103-2 can update the state of the memory block to a shared state, to indicate that other processors now have shared copies of the data in that memory block cached in their processor caches.

On the other hand, in some embodiments, if the node controller 103-2 receives the coherent read request and determines that the memory block mb03 is dirty, it will not send a copy of the data in the memory block mb03. Instead, in some embodiments, the node controller 103-2 transmits a message to the node controller of the processor owning the memory block mb03, indicating that the node controller 103-1 is performing or attempting a read of that memory block. That is, for purposes of illustration, it is assumed that the memory block mb03 of the memory 107-3 is owned by a processor Pn (not illustrated) corresponding to a node controller NCn (not illustrated). The node controller 103-2, upon receiving a coherent read request and determining that the memory block mb03 is dirty, notifies the node controller NCn that the node controller 103-1 is attempting to read the memory block mb03. The node controller NCn in turn transmits a request to the processor Pn for a copy of the data of the memory block mb03 cached in the processor cache of the processor Pn, and receives a response from the processor Pn, including the requested copy of the data. The node controller NCn in turn transmits a coherent response to the node controller 103-1. The node controller 103-1, in turn, transmits a coherent response to the requestor processor 105-1, including the copy of the data from memory block mb03 obtained from the cache of the processor Pn. The response and data included therein are said to be coherent because the data that is sent is the most up to date version, obtained not from the home memory but instead from the owner memory. In some embodiments, the node controller NCn can update its directory to change the state of that memory block as needed. In some embodiments, if the node controller NCn determines that one of its processors no longer has the data of the memory block mb03 cached, the node controller NCn transmits a response to the node controller 103-2 indicating as such. The node controller 103-2 thereby concludes its local copy of the data is valid and responds to the node controller 103-1 with a copy of the data from the memory block mb03.

In some embodiments, if the node controller 103-2 receives the coherent read request and determines that the memory block mb03 is dirty, it transmits to the node controller 103-1 a response including ownership information (e.g., owner ID) of the memory block mb03—indicating, for example, the processor that owns and has modified the memory block mb03, causing it to be "dirty." The node controller 103-1 therefore receives the response including the ownership information (e.g., owner ID=Pn) and, in turn, transmits a coherent read request to the node controller NCn, including the memory address (or other identifier) of the memory block mb03. The node controller NCn in turn transmits a request to the processor Pn for a copy of the data of the memory block mb03 cached in the processor cache of the processor Pn, and receives a response from the processor Pn, including the requested copy of the data. The node controller NCn in turn transmits a coherent response to the node controller 103-1. The node controller 103-1, in turn, transmits a coherent response to the requestor processor 105-1, including the copy of the data from memory block mb03 obtained from the cache of the processor Pn. The response and data included therein are said to be coherent because the data that is sent is the most up to date version, obtained not from the home memory but instead from the owner memory. In some embodiments, the node controller NCn can update its directory to change the state of that memory block as needed.

As mentioned above, other types of coherent operations can be handled, such as coherent writes. While cache coherent, hardware-based processing of other operations will not be described in further detail, it should be understood that the node controllers are configured to ensure that any operations, in any event, result in optimal coherency throughout the multiprocessor shared memory system.

Moreover, and still with reference to FIG. 2, in some embodiments, the node controllers are configured to provide hardware-based coherency by implementing snoop-based cache coherency protocols. In some embodiments, the node controllers provide snoop-based protocols by updating or invaliding data as needed to process coherent operations. For example, if the processor 105-1 issues a coherent write request for the memory block mb03 in the memory 107-3, the node controller 103-1 works on behalf of the processor 105-1 to obtain up-to-date or valid data either from the memory 107-3 or a copy thereof stored in caches of other processors. This can be done by broadcasting a read request to all processors having a copy of the data of the memory block mb03. In turn, in some embodiments in which update-based snoop coherency is implemented, when the processor 105-1 changes the received data, the written or updated data is propagated to the memory block mb03 in the memory 107-3 and broadcast to all processors that share the memory block mb03, to ensure that all processors subsequently have a coherent version of the data reflecting the changes made by the processor 105-1. On the other hand, in some embodiments in which invalidate-based snoop coherency is implemented, when the processor 105-1 changes the received data, the written or updated data is propagated to the memory block mb03 in the memory 107-3 and, invalidation messages are transmitted to the processors that share the memory block mb03. That is, a message is transmitted to cause all sharing processors to invalidate their out-of-date copies of the data of the memory block mb03. Such processing ensures that coherency is maintained, by either sending the updated data to all sharing processors, or by informing the sharing processors that their version of the data is out of date.

Figure 3:
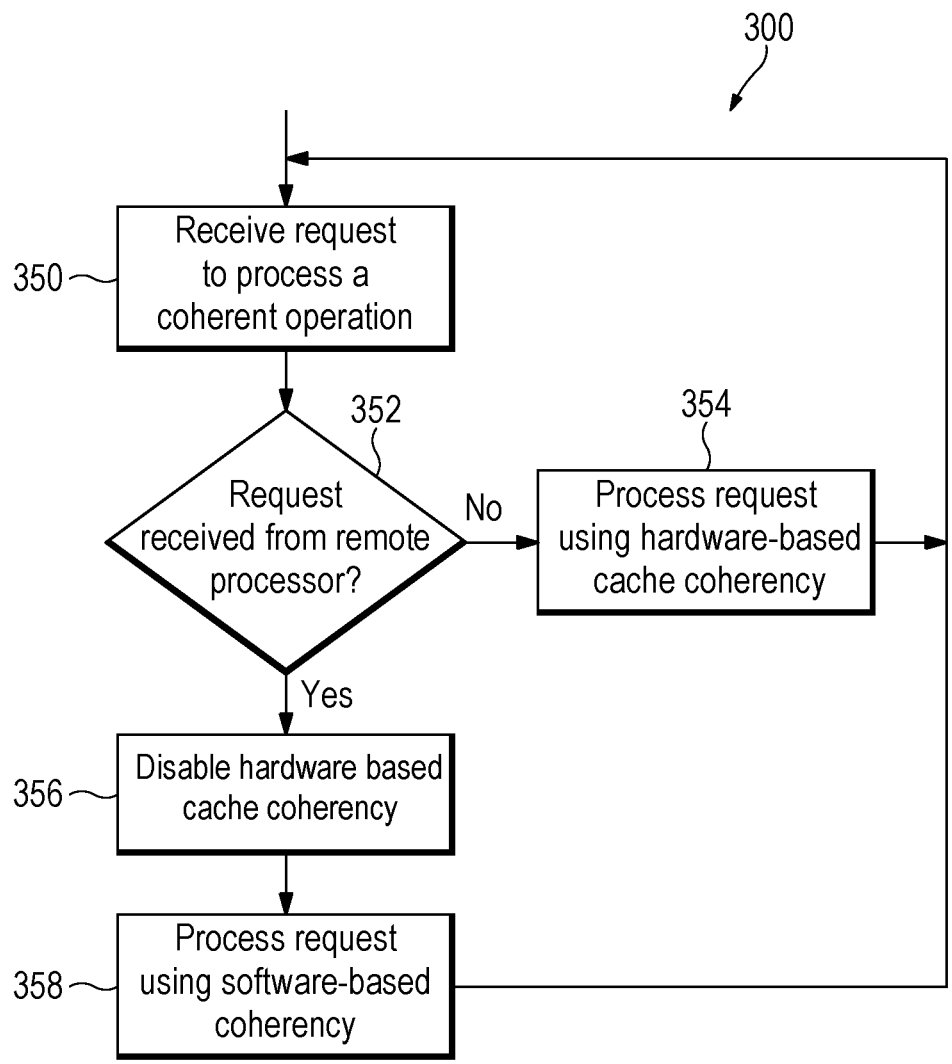
FIG. 3 is a flow chart illustrating a process for managing a cache coherency protocol according to exemplary embodiments.

FIG. 3 is a flow chart illustrating a process 300 for managing a cache coherency protocol according to exemplary embodiments. In some embodiments, the steps illustrated in the process 300 are performed by a node controller (e.g., node controller 103-2) receiving a cache coherency operation request such as a coherent read or coherent write request relating to one of its local or associated memories. As described above with reference to FIG. 2, a receiving node controller can provide hardware-based cache coherency by implementing directory and/or snoop-based cache coherency. Hardware-based cache coherency can be provided by executing logic or instructions using the hardware of the node controller (e.g., hardware state machine, hardware sequencer, microprocessor). As will now be described with reference to FIGS. 3 to 5, in some embodiments, hardware-based coherency can be disabled and, instead, a coherent operation is processed according to software-based cache coherency protocols.

At step 350 of the process 300, the node controller 103-2 receives a request for a coherent operation from a communicatively coupled node controller 103-1. The request can be, for example, a coherent read or coherent write request initiated by a processor local to the node controller 103-1, such as the processor 105-1. As described above, the request can include, among other things, the memory address of a memory block in a memory local to the node controller 103-2, such as the memory 107-3 associated with the processor 105-3. In some embodiments, it can also include an identifier of the source or requestor processor (e.g., processor 105-1).

In turn, at step 352, the node controller 103-2 determines whether the request is from a local or a remote processor. Such a determination can be made, for example, based on the requestor processor identifier. If the node controller 103-2 determines at step 352 that the request is from a local processor, the node controller 103-2 processes, at step 354, the coherent request according to hardware-based cache coherency protocols (e.g., directory- or snoop-based), example embodiments of which are described above with reference to FIG. 2. On the other hand, if the node controller 103-2 determines at step 352 that the request is from a remote processor, the node controller 103-2 can disable the hardware-based coherency at step 356. In turn, at step 358, the node controller 103-2 can process the coherent request according to software-based cache coherency protocols. The node controller, after processing the request at step 354 or 358, returns to step 350 to await the receipt of other requests.

Figure 4:
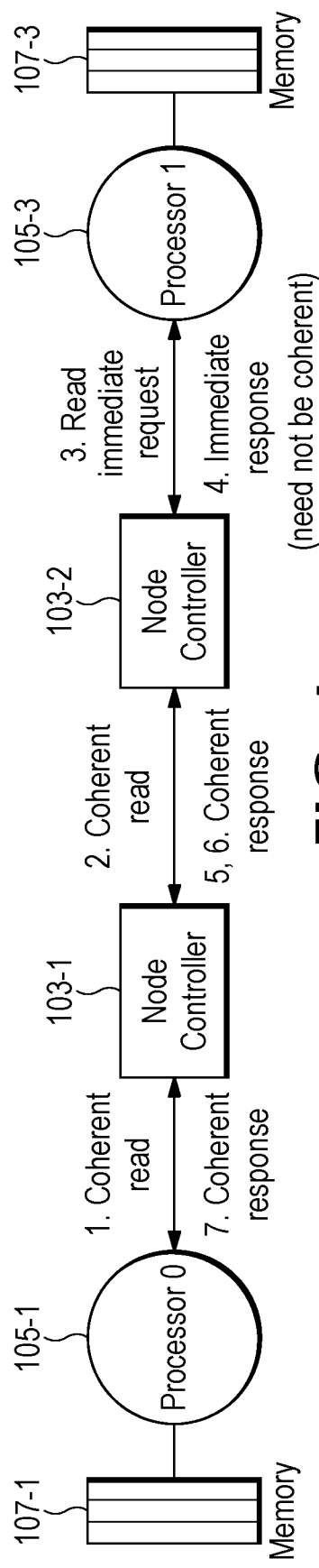
FIG. 4 is a diagram illustrating an exemplary embodiment of the cache coherent computing system of FIG. 1 for processing remote coherent read requests.

FIG. 4 illustrates an exemplary embodiment of the cache coherent computing system of FIG. 1 and processing remote coherent read requests therewith. As shown, the node controller 103-1 is associated with the processor 105-1 and its local memory 107-1, which may be just one of a number of processors and memories that are local to the node controller 103-1. The node controller 103-2 is associated with the processor 105-3 and its local memory 107-3, which may be just one of a number of processors and memories that are local to the node controller 103-2. Although not illustrated in FIG. 4, the processors 105-1 and 105-3 can include respective processor caches 105-1c and 105-3c, respectively. As described above, the node controllers 103-1 and 103-2 can be communicatively coupled to one another via a fabric 101 (not illustrated in FIG. 4), which can include or be made up of direct and/or switched interconnects, and the like.

In FIG. 4, the processor 105-1 transmits a coherent read request to the node controller 103-1. The coherent read request can include the type of the request, the identifier of the processor 105-1, and the address or identifier of the memory block from which data is to be read. In the example embodiment of FIG. 4, the request sent from the processor 105-1 to the node controller 103-1 is a coherent read type of request and includes a memory address m3x0003 or other identifier of a memory block mb03 located in the memory 107-3. The node controller 103-1 identifies the home node controller of the memory that includes the memory block referenced in the request. That is, based on the request, the node controller 103-1 identifies the node controller 103-2 as being the home node controller of the memory 107-3, and transmits to the node controller 103-2 the coherent read request originated from the processor 105-1.

The node controller 103-2 receives the coherent read request and, in turn, determines whether it is from a local processor or a remote processor. This determination can be made, for example, based on the port through which the request is received. That is, in some embodiments, ports of the node controllers are configured to receive messages from specific node controllers, such that messages received through one port are deemed to be from a certain node controller, while messages received through another port are deemed to be from another node controller. In some embodiments, one port can be for local messages, while another port can be for remote messages. In some embodiments, the determination of whether the message is from a local or remote source can be based on the information included in the request, such as an identifier of the source or requestor processor, namely processor 105-1. In some embodiments, the node controller 103-2 determines that the coherent read request is from a local processor or core (e.g., the processor 105-3), and the node controller 103-2 can perform normal processing using hardware-based cache coherency. On the other hand, in embodiments such as the one discussed herein with reference to FIG. 4, the node controller 103-2 determines that the coherent read request is from a remote processor, namely the processor 105-1.

When the node controller 103-2 determines that the coherent read request is from a remote processor, the node controller disables hardware-based cache coherency processing—meaning that it does not implement its normal directory and/or snoop-based cache coherency. Instead, the node controller 103-2 translates the received coherent read request into a read request that need not be coherent. In some embodiments, the read request can be a read-immediate type request. In contrast with a coherent read request, the read-immediate request need not adhere to cache coherency requirements such as determining whether or not the relevant memory block is dirty before sending the data from that memory block, and/or informing the node requestor processor and node controllers of the owner processor in instances when the memory block is dirty. Moreover, in contrast with hardware-based coherency in which the state and ownership information is updated when a memory block is read (e.g., to a shared state), the read-immediate request need not result in the tracking or updating of the state or ownership of the memory block.

In turn, the node controller 103-2 transmits the read-immediate request to the processor 105-3. The processor 105-3, immediately (or substantially immediately) obtains the data from the memory block mb03 of the memory 107-3 and transmits an immediate response with the data to the node controller 103-2. The node controller 103-1 prepares a response to transmit to the node controller 103-2. In some embodiments, this can include altering or adapting the response message to be responsive to the original coherent read request (e.g., changing the message type to be a coherent response). The node controller 103-2 in turn transmits the coherent response to the node controller 103-1 which, in turn, transmits the coherent response that was received from node controller 103-2 to the requestor processor 105-1.

As mentioned, the communications between the node controller 103-2 and the processor 105-3 may not be coherent when processing coherent requests from remote processors. In such cases, while the node controller 103-2 does not employ hardware-based coherency, coherency can nonetheless be provided or enforced by software, such as software stored in the system memory 107. Software-based coherency can be enforced using a variety of coherency protocols known to those of ordinary skill in the art. Software-based coherency protocols can be configured to determine whether to perform coherency functions and, if so, implement those coherency functions. For example, some protocols can be configured such that coherency is enforced for particular memory blocks, memory regions, and/or for particular types of processes or data.

For example, as described above, the memory 107 can include or have stored thereon software such as an operating system, hypervisor or other software applications. When a software application is run, processes are scheduled for execution and in turn executed by processors. As known, some of the processes can require access to data in shared memory, thereby causing the transmissions of coherent operation requests as described above. In accordance with exemplary software-based coherency protocols, the software (e.g., OS) can be configured to enforce coherency when reading or writing particular memory blocks or memory regions. Moreover, in accordance with exemplary software-based coherency protocols, the software (e.g., software application) can be configured to enforce coherency for particular processes or data. In accordance with exemplary software-based coherency protocols, the software, when appropriate, can track the state and/or ownership information of memory blocks, control access to certain memory blocks, and/or transmit updates to shared data (and/or state and/or ownership changes).

Figure 5:
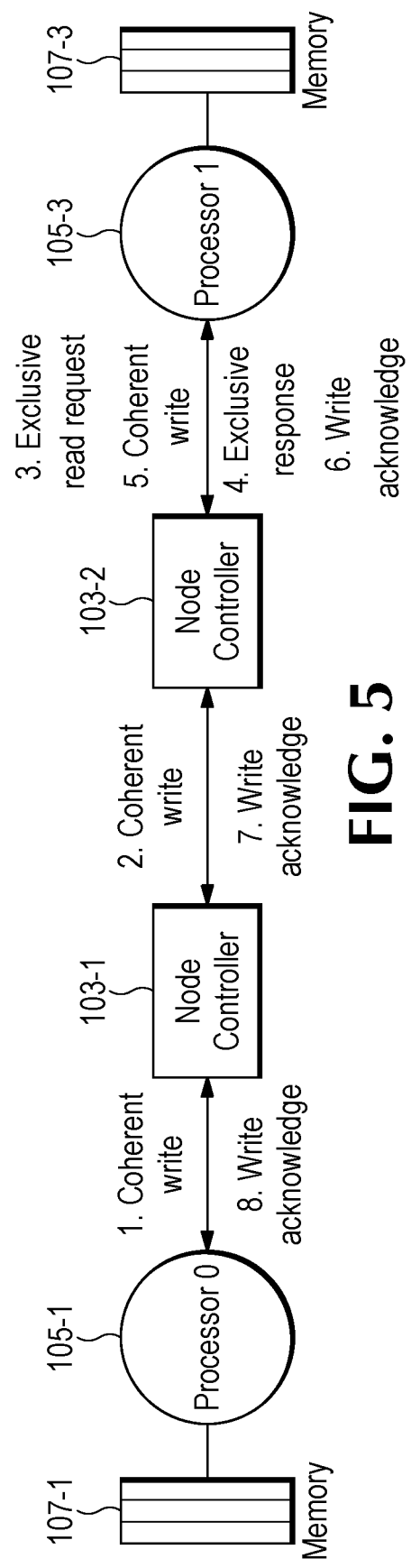
FIG. 5 is a diagram illustrating an exemplary embodiment of the cache coherent computing system of FIG. 1 for processing remote coherent write requests.

FIG. 5 illustrates an exemplary embodiment of the cache coherent computing system of FIG. 1 and processing remote coherent write requests therewith. As shown, the node controller 103-1 is associated with the processor 105-1 and its local memory 107-1, which may be just one of a number of processors and memories that are local to the node controller 103-1. The node controller 103-2 is associated with the processor 105-3 and its local memory 107-3, which may be just one of a number of processors and memories that are local to the node controller 103-2. Although not illustrated in FIG. 5, the processors 105-1 and 105-3 can include respective processor caches 105-1c and 105-3c, respectively. As described above, the node controllers 103-1 and 103-2 can be communicatively coupled to one another via a fabric 101 (not illustrated in FIG. 5), which can include or be made up of direct and/or switched interconnects, and the like.

In FIG. 5, the processor 105-1 transmits a coherent write request to the node controller 103-1. The coherent write request can include the type of the request, the identifier of the processor 105-1, the data payload, and the address or identifier of the memory block where the data is to be written. In the example embodiment of FIG. 5, the request sent from the processor 105-1 to the node controller 103-1 is a coherent write type of request and includes a memory address m3x0003 or other identifier of a memory block mb03 located in the memory 107-3. The node controller 103-1 identifies the home node controller of the memory that includes the memory block referenced in the request. That is, based on the request, the node controller 103-1 identifies the node controller 103-2 as being the home node controller of the memory 107-3, and transmits to the node controller 103-2 the coherent write request originated from the processor 105-1.

The node controller 103-2 receives the coherent write request and, in turn, determines whether it is from a local processor or a remote processor. This determination can be made based on the port through which the message is received and/or on information included in the request, such as the identifier of the source or requestor processor, namely processor 105-1. In some embodiments, the node controller 103-2 determines that the coherent write request is from a local processor or core (e.g., the processor 105-3), and the node controller 103-2 can perform normal processing using hardware-based cache coherency. On the other hand, in embodiments such as the one discussed herein with reference to FIG. 5, the node controller 103-2 determines that the coherent read request is from a remote processor, namely the processor 105-1.

As described above, when the node controller 103-2 determines that the coherent write request is from a remote processor, the node controller disables hardware-based cache coherency processing—meaning that it does not implement its normal directory and/or snoop-based cache coherency. Instead, the node controller 103-2 transmits an exclusive read, to make the node controller 103-2 the exclusive owner, at that time, of the memory block mb03. In turn, the processor 105-3 transmits an exclusive read response to the node controller 103-2, which can include an acknowledgment of the exclusive access to the memory block mb03 and/or the data retrieved from the memory block mb03 of the memory 107-3. Moreover, the processor 105-3 (and/or the node controller 103-2) can update a coherency directory to indicate that the state and ownership information should reflect that the node controller 103-2 has exclusive ownership of the memory block mb03.

In turn, the node controller 103-2 transmits a coherent write request to the processor 105-3, using the data payload from the original coherent write request originated from the processor 105-1. The processor 105-3 causes the memory block mb03 in the memory 107-3 to be written based on the data in the coherent write request and, in turn, transmits a write acknowledgment to the node controller 103-2, confirming that the requested write of the memory block mb03 has been performed. The node controller 103-2 transmits the write acknowledgment to the node controller 103-1, which in turn transmits it to the requestor processor 105-1.

Notably, in contrast with hardware-based cache coherency approaches, the write described with reference to FIG. 5 need not adhere to certain cache coherency requirements, such as updating copies of the data cached by sharing processors, or sending invalidation messages to those sharing processors, tracking remote owners, and transmitting snoop messages. Nonetheless, as described above, the node controller 103-2 can enforce cache coherency through a variety of software-based cache coherency protocols as known to those of ordinary skill in the art.

Figure 6:
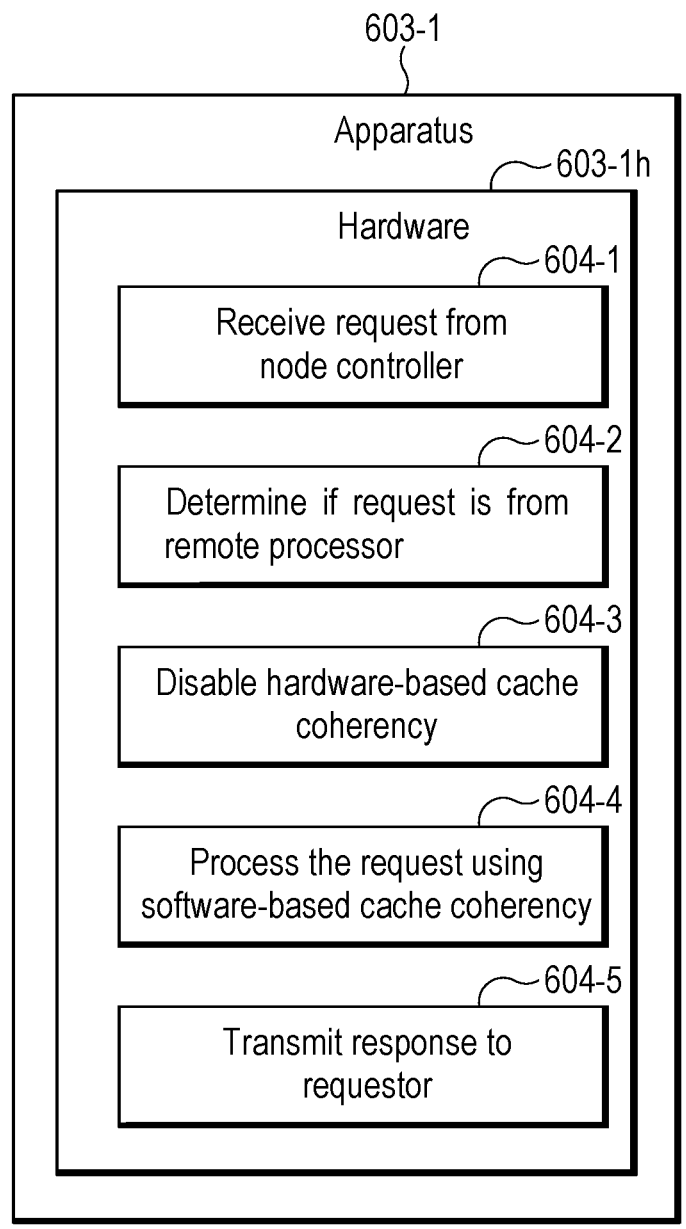
FIG. 6 is a diagram illustrating an exemplary embodiment of an apparatus for selectively disabling hardware-based coherency and enforcing software-based coherency.

FIG. 6 illustrates an exemplary embodiment of an apparatus 603-1 for managing cache coherency, including disabling hardware-based coherency and enforcing software-based coherency. The apparatus 603-1 includes hardware 603-1*h* (e.g., circuits, hardware logic, storage elements). The hardware 603-1*h* is configured to perform or execute methods, functions and/or processes as described herein. In some embodiments, these methods, functions and/or processes can be embodied as machine readable instructions or code stored on a computer readable medium such as RAM, ROM, EPROM, EEPROM of the apparatus 603-1. These instructions can be executed by one or multiple processors of the apparatus 603-1.

As shown in FIG. 6, the hardware 603-1*h* can include machine-readable and executable instructions 604-1 for receiving a first request from a node controller. In some embodiments, the first request is a request to process a cache coherent operation. The first request can include at least a request type and a memory address of a memory block in memory. The hardware 603-1*h* can also include machine-readable and executable instructions 604-2 for determining that the first request is from a remote processor. Moreover, the hardware 603-1*h* can include machine-readable and executable instructions 604-3 for disabling the enforcement of hardware-based cache coherency.

Still with reference to FIG. 6, the hardware 603-1*h* can include machine-readable and executable instructions 604-4 for processing the first request. In some embodiments, the processing of the first request can include causing the execution of software to enforce software-based cache coherency. Moreover, the hardware 603-1*h* includes machine-readable and executable instructions 604-5 for transmitting, to the requestor node controller, a response to the first request.

The invention claimed is:

1. An apparatus comprising:
   one or more hardware components associated with a first processor and a first memory and operable to enforce hardware-based cache coherency for memory blocks of the first memory,
   wherein the one or more hardware components are configured to:
     receive a first request from a node controller, the first request being a request to process a cache coherent operation, the first request including at least a request type and a memory address of a memory block in the first memory;
     determine that the first request is from a processor remote from the one or more hardware components;
     disable the enforcement of hardware-based cache coherency by the one or more hardware components;
     executing software to enforce software-based cache coherency in accordance with the first request; and
     transmit, to the node controller, a response to the first request.

2. The apparatus of claim 1,
   wherein the node controller is associated with at least a second processor and at least a second memory, the first memory and the second memory forming a shared memory,
   wherein the first memory is local relative to the first processor and remote relative to the second processor, and
   wherein the first request originates from the second processor.

3. The apparatus of claim 2,
   wherein the first request is a coherent read request, and
   wherein the processing of the first request comprises:
     translating the coherent read request to a non-coherent read request;
     transmitting the non-coherent read request to the first processor;
     receiving, from the first processor, a non-coherent response including data from the memory block of the first memory identified by the memory address included in the coherent read request; and transmitting, to the node controller, a coherent response responsive to the coherent read request, the coherent response including the data from the memory block received from the first processor.

4. The apparatus of claim 3, wherein the processing of the first request does not trigger tracking or storing of state and ownership information of the memory block identified in the first request.

5. The apparatus of claim 4, wherein the processing of the first request does not trigger communications with processors other than the first and second processors.

6. The apparatus of claim 3,
wherein the non-coherent read request is a read immediate request, and
wherein the non-coherent response from the first processor is a read immediate response.

7. The apparatus of claim 3, wherein the non-coherent read request and the non-coherent response result in not all of the data being coherent.

8. The apparatus of claim 2,
wherein the first request is a coherent write request, and
wherein the processing of the first request comprises:
transmitting an exclusive read request to the first processor, the exclusive read request being a request for ownership by the one or more hardware components of the memory block of the first memory identified by the memory address included in the coherent write request;
receiving an exclusive read response from the first processor, confirming ownership of the memory block identified by the memory address included in the coherent write request;
transmitting a write request to the first processor, the write request including data from the coherent write request;
receiving a write acknowledgment from the first processor; and
transmitting the write acknowledgment to the node controller.

9. The apparatus of claim 2,
wherein the first processor comprises first and second processor cores, and the first memory is local relative to the first and second processor cores, and
wherein the one or more hardware components are further configured to:
receive a second request from the first core, the second request being a request to process a cache coherent operation and including at least a request type and a memory address of a memory block in the first memory;
determine that the second request is from a processor core local to the first memory;
process the second request by enforcing hardware-based cache coherency by the one or more hardware components; and
transmitting, to the first core, a response to the second request.

10. A computer-implemented method comprising:
receiving, by a first node controller, a first request from a second node controller, the first node controller being associated with a first processor and a first memory, and being operable to enforce hardware-based cache coherency for memory blocks of the first memory,
wherein the first request is a request to process a cache coherent operation, and the first request includes at least a request type and a memory address of a memory block in the first memory;
determining, by the first node controller that the first request is from a processor remote from the one or more hardware components;
disabling the enforcement of hardware-based cache coherency by the one or more hardware components;
executing software to enforce software-based cache coherency in accordance with the first request; and
transmitting, to the second node controller, a response to the first request.

11. The computer-implemented method of claim 10, wherein:
the second node controller is associated with at least a second processor and at least a second memory, the first memory and the second memory forming a shared memory,
the first memory is local relative to the first processor and remote relative to the second processor, and
the first request originates from the second processor.

12. The computer-implemented method of claim 11,
wherein the first request is a coherent read request, and
wherein the processing of the first request comprises:
translating the coherent read request to a non-coherent read request;
transmitting the non-coherent read request to the first processor;
receiving, from the first processor, a non-coherent response including data from the memory block of the first memory identified by the memory address included in the coherent read request; and
transmitting, to the second node controller, a coherent response responsive to the coherent read request, the coherent response including the data from the memory block received from the first processor.

13. The computer-implemented method of claim 12, wherein:
the processing of the first request does not trigger tracking or storing of state and ownership information of the memory block identified in the first request, and
the processing of the first request does not trigger communications with processors other than the first and second processors.

14. The computer-implemented method of claim 11,
wherein the first request is a coherent write request, and
wherein the processing of the first request comprises:
transmitting, by the first node controller, an exclusive read request to the first processor, the exclusive read request being a request for ownership by the first node controller of the memory block of the first memory identified by the memory address included in the coherent write request;
receiving an exclusive read response from the first processor, confirming ownership by the first node controller of the memory block identified by the memory address included in the coherent write request;
transmitting a write request to the first processor, the write request including data from the coherent write request;
receiving a write acknowledgment from the first processor; and
transmitting the write acknowledgment to the node controller.

15. The computer-implemented method of claim 11,
wherein the first processor comprises first and second processor cores, and the first memory is local relative to the first and second processor cores, and wherein the computer-implemented method further comprises:
  receiving a second request from the first core, the second request being a request to process a cache coherent operation and including at least a request type and a memory address of a memory block in the first memory;
  determining that the second request is from a processor core local to the first memory;
  processing the second request by enforcing hardware-based cache coherency by the first node controller; and
  transmitting, to the first core, a response to the second request.

16. A system comprising:
a plurality of communicatively coupled node controllers, each of the node controllers being associated with and managing cache coherency of a plurality of processors and memories,
wherein each of the node controllers includes hardware components configured to:
  identify whether coherent operation requests are from processors remote from the one or more hardware components or processor cores local to the first memory;
  process the coherent operation requests based on the determination of whether the coherent operation requests are from processors remote from the one or more hardware components or processor cores local to the first memory,
wherein, the processing of the coherent operation requests received from processors remote from the one or more hardware components includes enforcing hardware-based cache coherency, and the processing of the coherent operation requests received from processor cores local to the first memory includes disabling hardware-based cache coherency and enforcing software-based cache coherency.

17. The system of claim 16,
wherein the plurality of node controllers includes at least a first node controller associated with at least a first processor and a first memory, and a second node controller associated with at least a second processor and a second memory, and
wherein the first memory is local relative to the first processor and remote relative to the second processor, and the second memory is local relative to the second memory and remote relative to the first processor.

18. The system of claim 16, wherein the memories form a shared memory operable to store software, wherein the software includes stored software configured to enforce cache coherency for one or more of the memories.

* * * * *